(12) United States Patent
Plotkin et al.

(10) Patent No.: US 10,108,104 B2
(45) Date of Patent: Oct. 23, 2018

(54) METHOD AND APPARATUS FOR CONTROLLING MULTIPLE BEAM SPACING

(71) Applicant: HEWLETT-PACKARD DEVELOPMENT COMPANY, L.P., Houston, TX (US)

(72) Inventors: Michael Plotkin, Rehovot (IL); David Towner, Boise, ID (US); Haim Livne, Kfar-Sava (IL); Peter Gysling, New Plymouth, ID (US); Craig Breen, Rehovot (IL); Dale Wolin, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 461 days.

(21) Appl. No.: 14/493,595

(22) Filed: Sep. 23, 2014

(65) Prior Publication Data

US 2015/0010316 A1    Jan. 8, 2015

Related U.S. Application Data

(62) Division of application No. 11/709,394, filed on Feb. 21, 2007, now Pat. No. 8,885,239.

(51) Int. Cl.

| | |
|---|---|
| *G02B 26/08* | (2006.01) |
| *G03G 15/043* | (2006.01) |
| *G02B 27/09* | (2006.01) |
| *B41J 2/47* | (2006.01) |
| *G02B 13/12* | (2006.01) |
| *G03G 15/04* | (2006.01) |

(Continued)

(52) U.S. Cl.
CPC ............ *G03G 15/043* (2013.01); *B41J 2/473* (2013.01); *G02B 13/12* (2013.01); *G02B 26/0883* (2013.01); *G02B 27/0911* (2013.01); *G03G 15/0409* (2013.01); *H04N 1/053* (2013.01); *G03G 15/0435* (2013.01); *G03G 2215/0404* (2013.01); *H04N 1/1135* (2013.01); *H04N 1/12* (2013.01); *H04N 2201/04763* (2013.01)

(58) Field of Classification Search
CPC ................ G02B 26/08; G02B 26/0875; G02B 26/0883; G02B 26/0891; G02B 26/10; G02B 26/101; G02B 26/108
See application file for complete search history.

(56) References Cited

U.S. PATENT DOCUMENTS

| | | |
|---|---|---|
| 4,342,906 A | 8/1982 | Hyatt |
| 4,425,023 A | 1/1984 | Matsumoto et al. |

(Continued)

FOREIGN PATENT DOCUMENTS

| | | |
|---|---|---|
| CN | 1431538 A | 7/2003 |
| JP | H06331913 A | 12/1994 |

(Continued)

*Primary Examiner* — Thong Nguyen
(74) *Attorney, Agent, or Firm* — HP Inc. Patent Department

(57) ABSTRACT

An anamorphic optical element and an adjustment mechanism for selectively rotating the optical element either around an axis substantially in a vertical direction, an axis substantially in an optical axis direction, an axis substantially in a plane formed by the vertical direction and the optical axis direction, or combination of axes thereof is used to vary a vertical separation between two or more spots.

11 Claims, 13 Drawing Sheets

(51) Int. Cl.
*H04N 1/053* (2006.01)
*H04N 1/113* (2006.01)
*H04N 1/12* (2006.01)

(56) References Cited

U.S. PATENT DOCUMENTS

| | | | | |
|---|---|---|---|---|
| 4,768,184 | A * | 8/1988 | Reno | G02B 26/08 359/211.2 |
| 4,969,137 | A * | 11/1990 | Sugiyama | G11B 7/08517 250/201.5 |
| 5,614,961 | A * | 3/1997 | Gibeau | G02B 26/10 348/203 |
| 5,920,361 | A * | 7/1999 | Gibeau | G02B 26/10 348/750 |
| 6,118,570 | A | 9/2000 | Kanai et al. | |
| 6,232,991 | B1 | 5/2001 | Appel | |
| 6,429,982 | B2 | 8/2002 | Bolt | |
| 6,430,125 | B1 * | 8/2002 | Alon | G11B 7/0943 369/44.32 |
| 6,678,095 | B2 | 1/2004 | Kelly | |
| 6,856,438 | B2 | 2/2005 | Takanashi et al. | |
| 6,964,484 | B2 | 11/2005 | Gupta et al. | |
| 7,019,768 | B2 | 3/2006 | Takeuchi et al. | |
| 7,036,904 | B2 * | 5/2006 | King | B41J 29/393 347/19 |
| 7,079,469 | B2 | 7/2006 | Itoh et al. | |
| 2003/0015978 | A1 | 1/2003 | Sulik | |
| 2005/0168704 | A1 | 8/2005 | Gupta et al. | |
| 2014/0125924 | A1 * | 5/2014 | Choi | G02F 1/133528 349/96 |
| 2016/0103306 | A1 * | 4/2016 | Takahashi | G02B 17/0816 345/8 |

FOREIGN PATENT DOCUMENTS

| | | |
|---|---|---|
| JP | 2002287060 A | 10/2002 |
| JP | 2006-53953 * | 2/2006 |

* cited by examiner

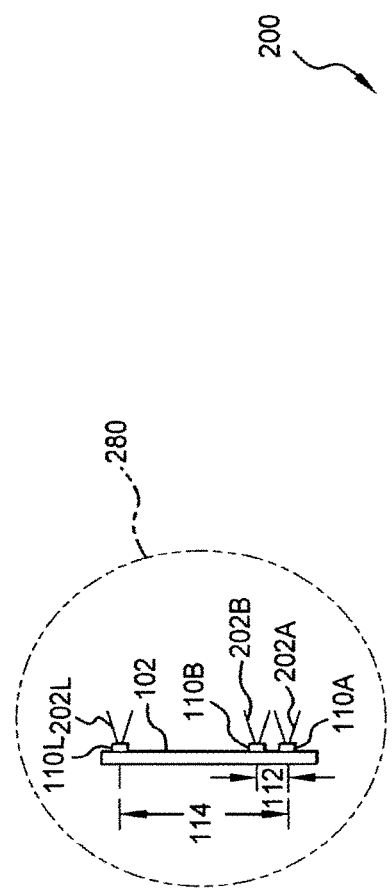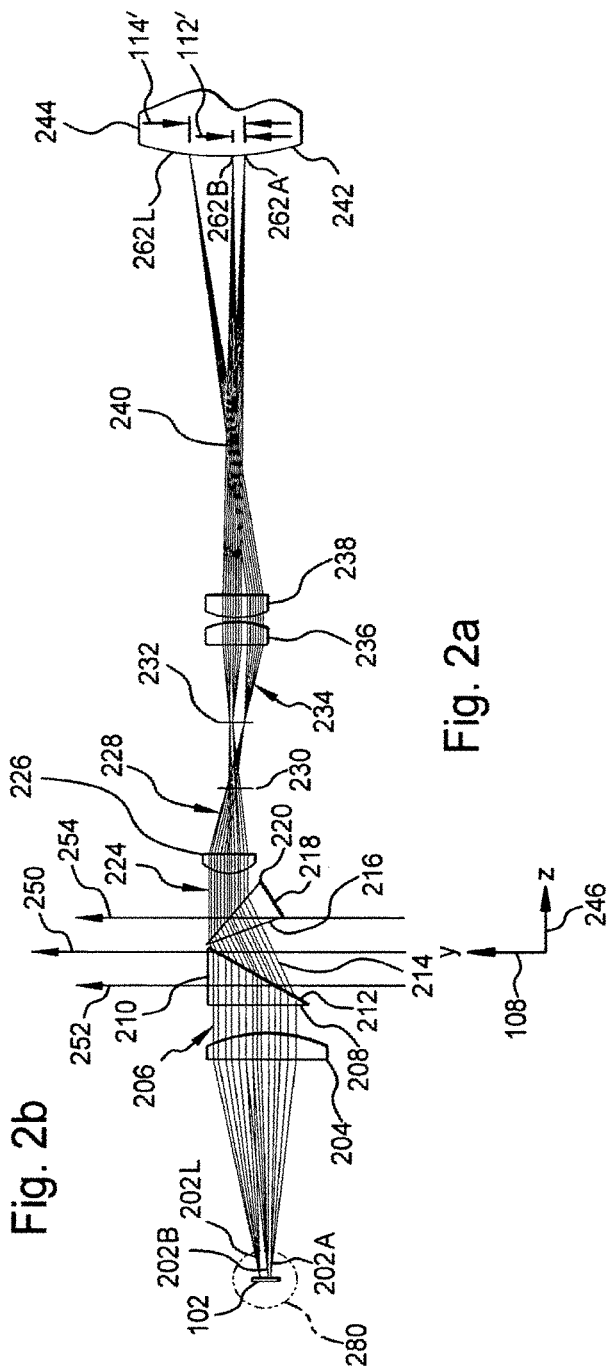
Fig. 2b
Fig. 2a

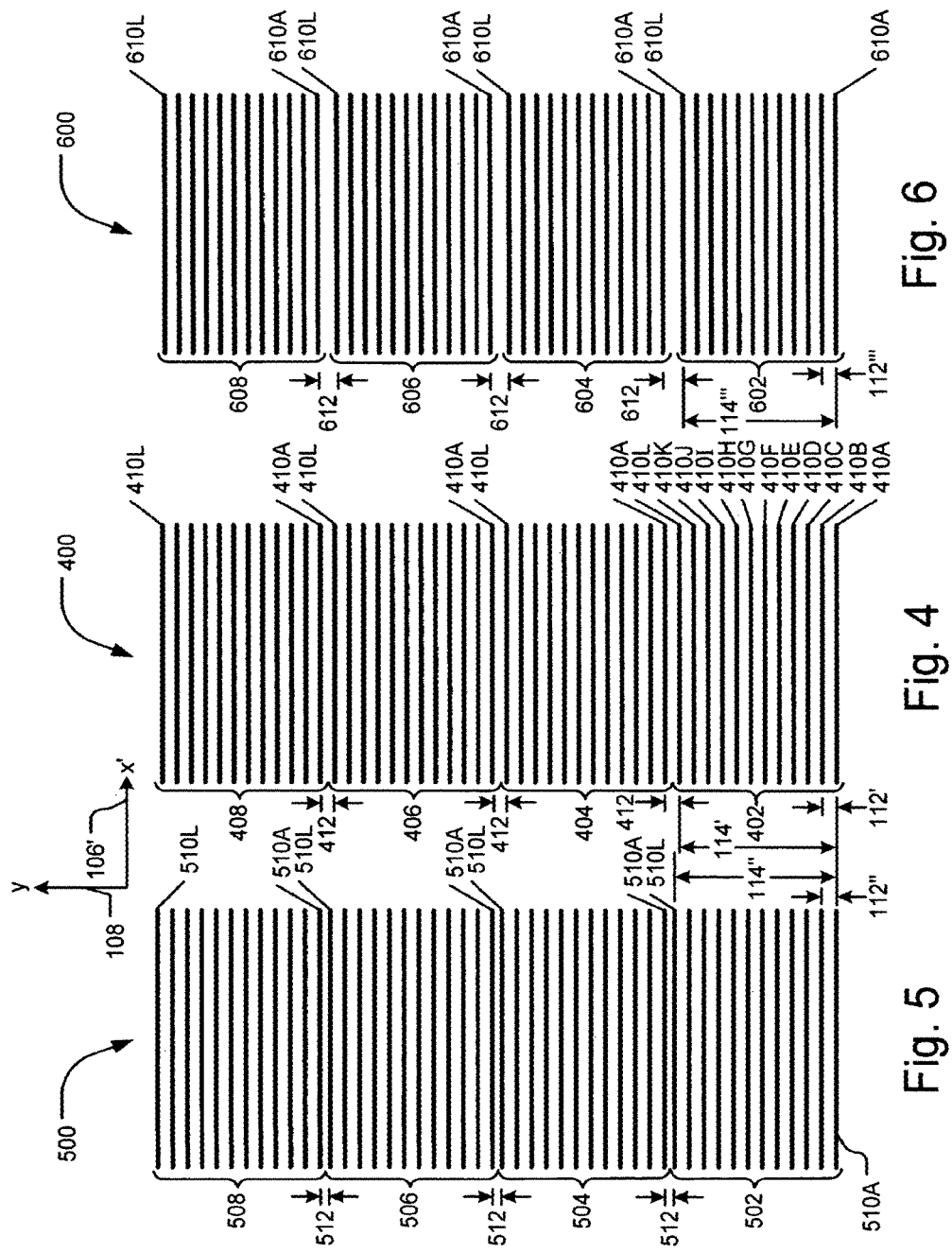

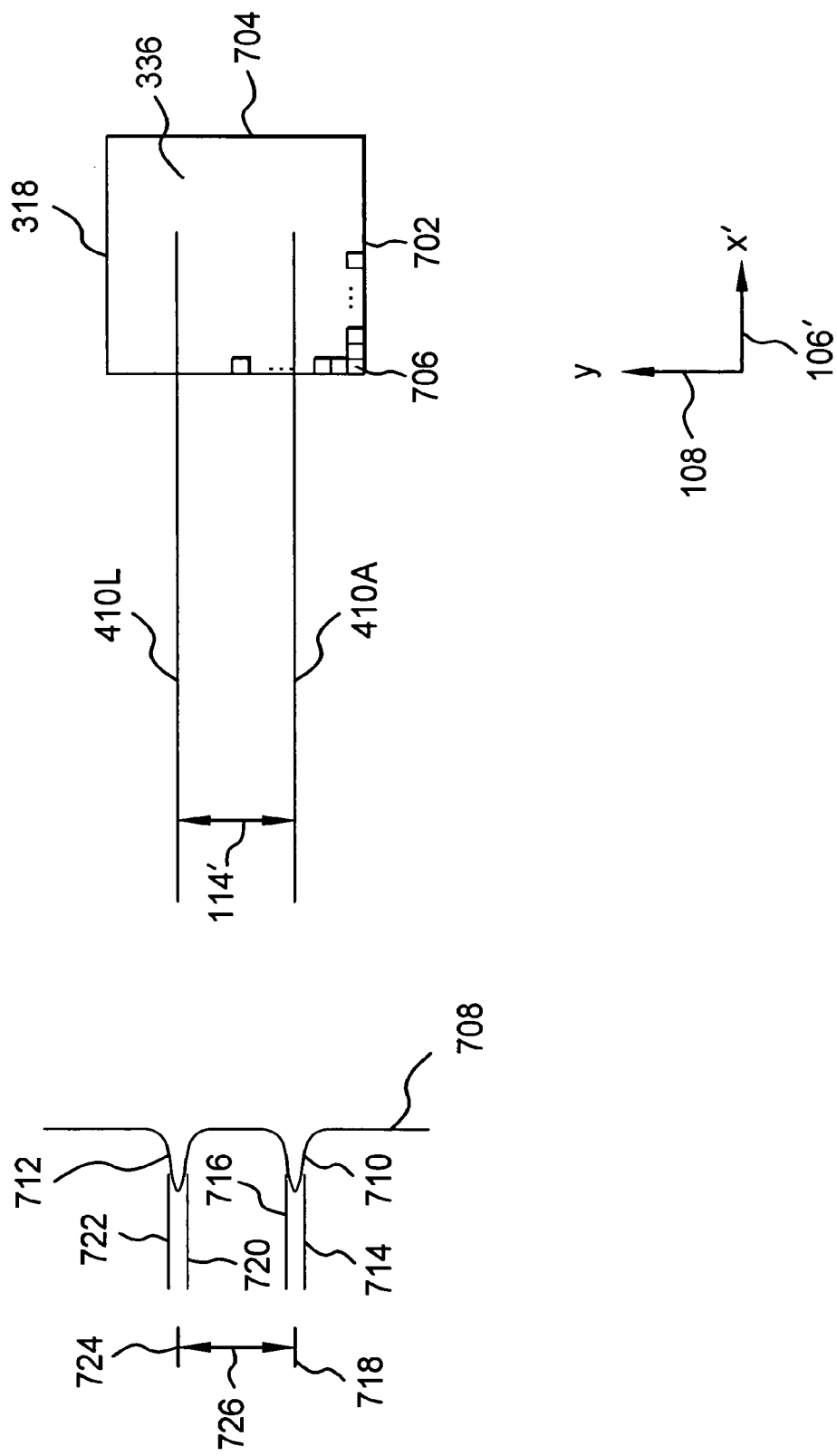

METHOD AND APPARATUS FOR CONTROLLING MULTIPLE BEAM SPACING

BACKGROUND

Recent improvements in printing have concentrated on increasing the speed of printing pages. In an electrophotographic printer, multiple light beams from a light emitter array may be used to increase print speed by forming swaths of scan lines. If the scan lines in a swath are not properly spaced, banding occurs. Banding lowers print quality.

The spacing of the scan lines is precisely aligned in an exposure module of the printer that is sent to the user. The module may be shipped with the printer. The module may become misaligned in shipping, printer setup, printer operation, and the like. The misalignment may be due to temperature variations, vibration, pressure, or other factors. If the printer exhibits banding, the module is removed from the printer and sent to a laboratory especially equipped for precisely aligning the exposure module. Removing and realigning the module is costly. The act of realigning the exposure module may not eliminate, nor minimize, nor guarantee the future absence of banding. When the exposure module is removed, the printer may be unavailable for use.

Therefore, there is a need for adjusting scan line spacing in electrophotographic printers which have multiple light beams. There is also a need to avoid the costly process of removing and realigning the exposure module. Furthermore, there is a need to improve the availability of the printer for use.

BRIEF DESCRIPTION OF THE DRAWINGS

Embodiments for an optical adjustment of a multibeam system can be better understood with reference to the following drawings which show an embodiment of a printing system. The elements of the drawings may not be to scale relative to each other. Rather, emphasis has been placed upon clearly illustrating the embodiments of the multibeam adjustment in a printer. Certain dimensions have been exaggerated in relation to other dimensions for clarity and better understanding of this disclosure. Furthermore, like reference numerals designate corresponding similar parts through the several views.

FIG. 2a illustrates a cross sectional diagram of a portion of an optical system, including the light emitter array of FIG. 1 according to an embodiment of an electrophotographic printing system.

FIG. 2b illustrates an enlarged view of the light emitter array of an optical system shown in FIG. 2a.

FIG. 4 shows swaths of scan lines which are correctly aligned according to an embodiment of an electrophotographic printing system.

FIG. 5 illustrates swaths of scan lines which are spaced apart according to an embodiment of an electrophotographic printing system.

FIG. 6 shows swaths of scan lines which are narrowly spaced according to an embodiment of an electrophotographic printing system.

FIG. 7 shows scan lines illumating an optical sensor and the spatial distribution of light according to an embodiment of an electrophotographic printing system.

DESCRIPTION

Electrophotographic printers can use multiple light beams from a light emitter array to increase printing speed. Rather than scanning one beam across a photosensitive medium to form one scan line, two or more beams may be scanned concurrently to produce two or more scan lines in an image. The intensity of each beam may be independently modulated to render an image.

Each group of scan lines exposed by a group of light beams emitted by a light emitter array forms a swath of scan lines. If the height of a swath is correct, successive swaths are properly spaced and there is little line-to-line spacing variation in the image. However, if the height of a swath is large, the space between adjacent swaths becomes narrow. In printed output, dark scan lines on a light background may appear to have an anomalously dark band between adjacent swaths. This line-to-line variation in perceived print density is a form of banding. Furthermore, if the height of a swath is small, the space between adjacent swaths becomes wide. Dark scan lines printed on a light background may then appear to have an anomalously light band between adjacent swaths. This line-to-line variation is also a form of banding.

To reduce banding, the light emitter array may be adjusted. For example, the light emitter array may be rotated such that there is little line-to-line spacing variation within a swath and between swaths. However, the swath height is sensitive to rotations of the light emitter array. This sensitivity is such, that, to achieve correct swath alignment, it is often necessary to precisely rotate the light emitter array in a specially equipped laboratory.

As described herein—in an embodiment of an electrophotographic printing system—one or more optical elements in the optical path are rotated. The one or more optical elements may be, but are not limited to, prisms. The rotation may be around an optical axis, a vertical axis, or an axis in the plane of the optical axis and the vertical axis. The rotation adjusts a vertical spacing of the light emitter array and thereby adjusts scan line spacing. The rotation of one or more prisms around one or more of these axes results in less sensitivity of beam spacing to adjustment in angle than by rotating the light emitter array. This reduction in sensitivity is desirable. The reduction in sensitivity allows the swath height to be adjusted at a site where the printer is used without the inconvenience and cost of removing the exposure module from the printer and sending it to a possibly distant facility for adjustment. Furthermore, the change in beam spacing is substantially linear with prism rotation, making automatic control of swath height stable and predictable.

Figure 1:
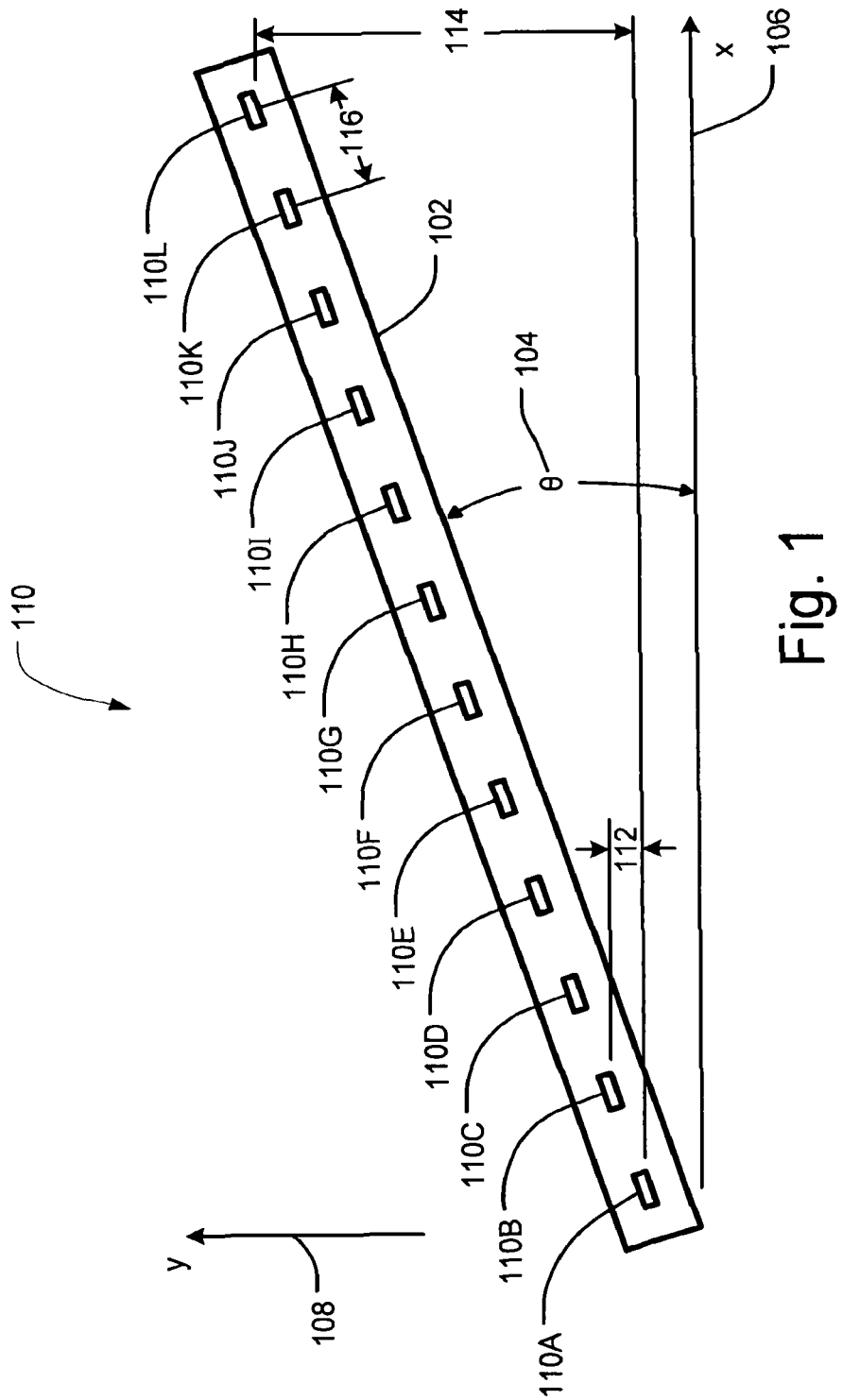
FIG. 1 shows a cross sectional view of a light emitter array according to an embodiment of an electrophotographic printing system.

Embodiments which describe beam height adjustment are described in reference to the following figures:

FIG. 1 shows a light emitter array 102 according to an embodiment of an electrophotographic printing system. The light emitter array 102 may be formed from light sources 110. As an example, the light emitter array 102 may be formed from individual light sources 110A through 110L stacked together or fabricated in proximity to each other. Regardless, the light emitter array 102 is not limited to these types of devices. Twelve light sources 110A through 110L are shown; although, there may be more or less than twelve light sources. The light emitter array 102 may be formed from light sources 110 which are laser diodes. The laser diodes may be elements of an edge-emitting laser array formed from a single epitaxial structure; they may also be elements of a one or two dimensional vertical cavity surface emitting laser array (VCSEL), a vertical external-cavity surface-emitting laser array (VECSEL), and the like.

The light emitter array 102 is shown at an angle theta 104. The light sources 110 may be individually modulated. When beams produced by the light sources 110 are scanned across a photosensitive medium, a swath of scan lines in an image is formed; the swath having a height which is proportional to a vertical separation 114 between the most distant light sources 110A and 110L. The light emitter array 102 may have more or less than twelve light sources, and a wider or narrower spacing 116 between adjacent light sources.

The angle theta 104 allows a vertical distance 112 between adjacent light sources in a vertical direction to be less than the spacing 116 between adjacent light sources. A light array 102 may be, for example, a monolithic laser array; and may have a spacing 116 between adjacent light sources of about 100 microns. However, in an electrophotographic printing system, it may be desirable to have a beam spacing in a vertical direction 108 of much less than 100 microns, for example, 5 microns. This beam spacing may be achieved by rotating the light emitter array 102 at the angle theta 104 relative to the light emitter array's 102 scan direction axis 106, such that the vertical distance 112 between adjacent light sources in the vertical direction 108 is less than the spacing 116 between adjacent light sources 110K and 110L, 110J and 110K, 110I and 110J and the like. Correspondingly, the vertical separation 114 between the most distant light sources 110A and 110L can be adjusted by rotating the light emitter array 102 by the angle theta 104.

FIG. 2a illustrates a cross sectional diagram of a portion of an optical system 200 according to an embodiment of an electrophotographic printing system. FIG. 2b is an expanded cross sectional view 280 of the light emitter array 102 showing light sources 110A, 110B, and 110L. Although, light sources 110C through 110K are not shown in FIG. 2, they are between light sources 110B and 110L as shown in FIG. 1. Adjacent light sources, such as 110A and 110B are separated by a vertical distance 112. The most distant light sources 110A and 110L are separated by a vertical separation 114. The vertical separation of the most distant light sources 110A and 110L determines a vertical separation 114', 114'', 114''' (See FIGS. 4,5, and 6) of spots in an image of the most distant light sources 110A and 110L.

In FIG. 2a, light beams 202A, 202B, and 202L are emitted from light sources 110A, 110B, and 110L respectively. Light beams 202A, 202B, and 202L travel substantially in the optical axis direction 246. Light beams 202 travel through a collimating element 204, which may be a lens.

Substantially collimated light beams 206 are directed to a first optical element 210 which is capable of redirecting an angle of the collimated light beams 206 to form redirected light beams 214. The first optical element 210 may be a prism, a diffraction grating, a Fresnel prism, a cylinder lens, a gradient index plate, or another optical element. Substantially collimated light beams 206 are shown as an embodiment of an electrophotographic printing system; however, it is not necessary to have collimated light beams 206. Converging or diverging beams may also be used rather than substantially collimated light beams 206. The first optical element 210 which has a first surface 208 and a second surface 212 is shown as a prism in an embodiment of an electrophotographic printing system. However, this embodiment is not limited to a prism, as described by the list of alternative optical elements 210 above.

The redirected light beams 214 travel to a second optical element 218 which is capable of redirecting the light beams 214 again to form light beams 224. The second optical element 218 may also be a prism, a diffraction grating, a Fresnel prism, a cylinder lens, a gradient index plate, or another optical element. The second optical element 218 is shown as a prism having a first surface 216 and a second surface 220. Nonetheless, the second optical element 218 is not limited to a prism.

It is not necessary that the first optical element 210 be the same type as the second optical element 218. As an example, the first optical element 210 may be a diffraction grating and the second optical element 218 may be a gradient index plate. One skilled in the art will appreciate that other combinations are possible, and therefore, this example is not limiting.

The second redirected light beams 224 pass through a cylinder lens 226 to become light beams 228. The light beams 228 pass through an aperture 230. The aperture 230 defines a cross-section of each beam 228 which has passed through the cylindrical lens 226, and determines which rays from each light source 110A through 110L pass through the optical system.

Figure 3:
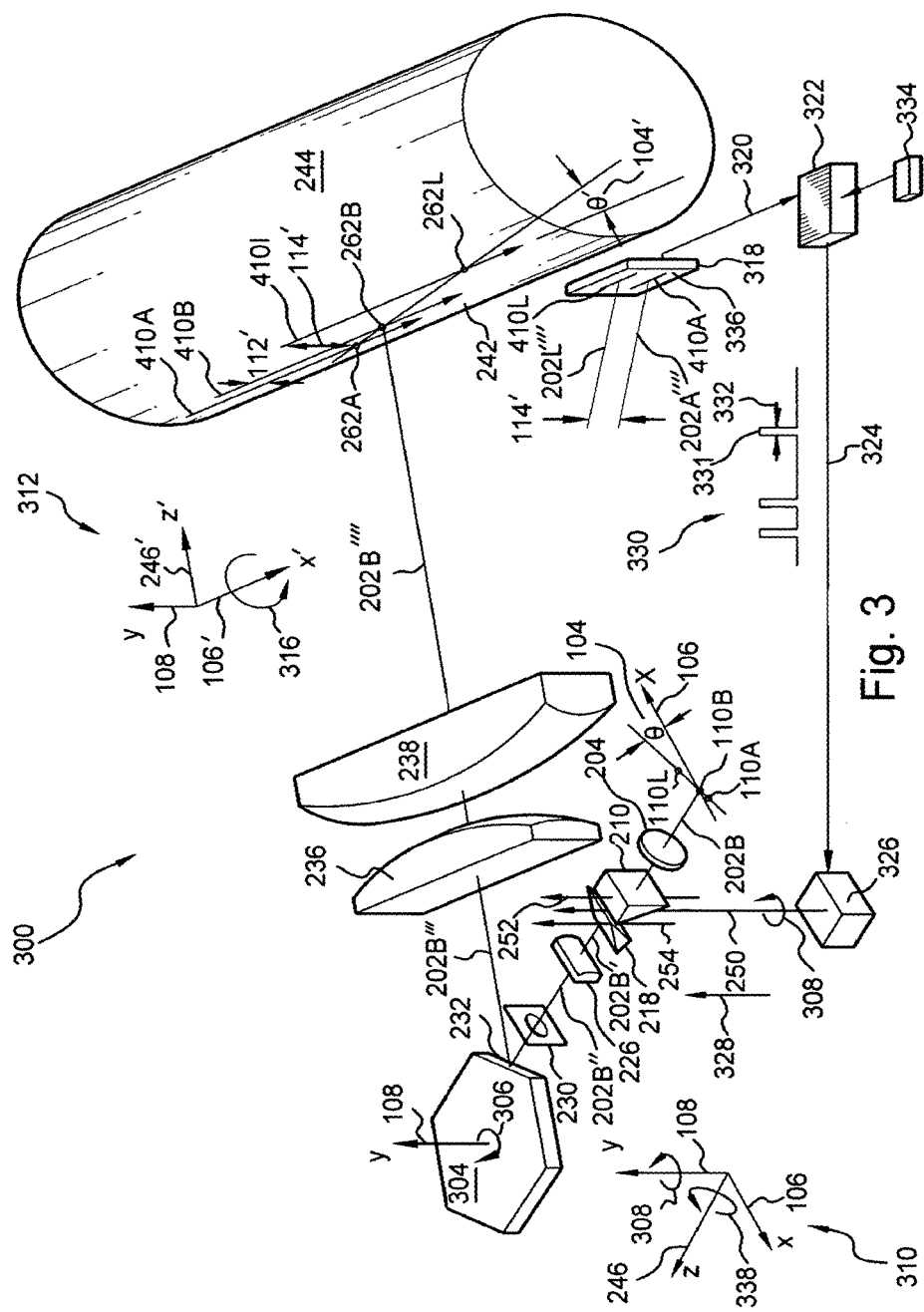
FIG. 3 shows a perspective view of an optical system according to an embodiment of an electrophotographic printing system.

The cylindrical lens 226 brings each incoming beam 224 to a line focus at a polygon surface 232 of a polygon 304 (See FIG. 3). Focusing each beam to a line at the polygon surface 232 reduces the effect of the rotational dynamic instability of the polygon 304 on the printing system. Rotational dynamic instability may be called wobble. Focusing each beam 228 to a line at the polygon surface 232 also reduces the effect of errors in the facet of the polygon 304 on the printing system as shown in FIG. 3.

Beams 234 reflect from the surface 232 of a polygon 304 (See FIG. 3). After reflecting from the surface 232 of the polygon 304, the beams 234 pass through a first scan lens 236 and a second scan lens 238 which converges beams 240 to spots 262A, 262B, and 262L. The spots 262A, 262B, and 262L correspond to light beams 202A, 202B, and 202L and illuminate a surface 242 of a photosensitive medium 244. The illumination of the surface 242 of the photosensitive medium 244 exposes the photosensitive medium 244, thereby forming a latent image on the surface 242 of the photosensitive medium 244. The latent image can be an electrostatic potential difference on the surface 242 which will be developed and transferred to media as described in reference to FIG. 14. The photosensitive medium 244 can be a photoconductor.

A vertical distance 112' between adjacent spots 262A and 262B is proportional to the vertical distance 112 between adjacent light sources 110A and 110B. A vertical separation 114' between the most distant spots 262A and 262L is proportional to the vertical separation 114 between the most distant light sources 110A and 110L.

Either the first optical element 210, or the second optical element 218, or combinations thereof may be rotated around an axis in the vertical direction 108. As an example, the first optical element 210 may be rotated about an axis 252 in the vertical direction which passes near the first optical element 210. The second optical element 218 may be rotated about an axis 254 which passes near the second optical element 218. Both the first optical element 210 and the second optical element 218 may be rotated around a vertical axis 250 passing near the first optical element 210 and the second optical element 218. Either the first optical element 210, or the second optical element 218, or both may be rotated around another vertical axis such as 328 which will be described in reference to FIGS. 3 and 8.

It is not necessary that either the first optical element 210, or the second optical element 218, or both be precisely rotated around a vertical axis, such as, but not limited to, vertical axes 108, 250, 252, 254, or 328. The vertical separation 114' of the most distant spots 262A and 262L; and the vertical distance 112' of adjacent spots 262A and 262B can be controlled by rotations about a vertical axis which are significantly tilted in the scan axis direction 106 as shown and described in reference to FIG. 3.

FIG. 3 shows a perspective view of an optical system 300 according to an embodiment of an electrophotographic printing system. Light sources 110A, 110B, and 110L are part of a light emitter array 102 (not shown, see FIGS. 1 and 2). The light sources 110A, 110B, and 110L may be rotated at an angle theta 104 relative to the light emitter array 102 scan axis direction 106 for the purpose of establishing a vertical distance 112' between spots 262A and 262B, and a vertical separation 114' between spots 262A and 262L. Spots 262A and 262L may illuminate a surface 242 of a photosensitive medium 244. Spots 262A through 262L are subsequently referred to as spots 262. A small change in the angle theta 104 can result in a relatively large change in both the vertical distance 112' and vertical separation 114' between spots 262. This sensitivity to the small change in angle theta 104 is undesirable for adjusting the vertical separation 114' because a change in the angle theta 104 due to thermal shock, vibration, or other factors may significantly change both the vertical distance 112' and vertical separation 114' between the spots 262. Such a change in both the vertical distance 112' and vertical separation 114' between spots 262 can result in undesirable banding in a printed image.

In a similar manner as described in reference to FIG. 2, a light beam 202B traveling in an optical axis direction 246 of the coordinate system 310 passes through a collimating element 204. The collimating element 204 may be a lens. For clarity, light beams 202A, and 202C through 202L are not shown. Light beam 202B is represented by a single line. The light beam 202B passes through a first optical element 210 and a second optical element 218. The first optical element 210 and the second optical element 218 are configured to magnify anamorphically. Either the first optical element 210, or the second optical element 218 or both elements may be adapted to magnify anamorphically. Anamorphic magnification is characterized as having a different magnification in a vertical direction 108 than in a scan axis direction 106.

After the light beam 202B passes through the first optical element 210 and the second optical element 218, the light beam 202B is represented by reference number 202B'. The light beam 202B' passes through a cylindrical lens 226 to form a light beam 202B". An aperture 230 defines the cross-section of the beams 202A" through 202L" including the beam 202B", and determines which rays in the beams 202A" through 202L" pass through the optical system 300.

Beam 202B" is focused to a line on the polygon surface 232 of polygon 304. Focusing light beams 202A' through 202L' (which include light beam 202B') to lines at the polygon 304 surface 232 reduces the effect of the rotational dynamic instability of the polygon 304 on the printing system. Dynamic instability is sometimes called wobble. Focusing each beam 202A' through 202L' to a line at the polygon surface 232 also reduces the effect of errors in the facet of the polygon 304 on the printing system. After beam 202B" is reflected from the surface 232 of a rotating 306 polygon 304, the stationary beam 202B" is converted into a scanning beam 202B'''. The rotation 306 of the polygon 304 is substantially around an axis in the vertical direction 108 and changes the angular direction of the beam 202B''' in time in the x'-z' plane defined by the scan axis direction 106' and the optical axis direction 246'. Beam 202B''' is illustrated at a time when the beam 202B''' travels substantially along the primed optical axis direction 246' in coordinate system 312.

Light beam 202B''' passes through a first scan lens 236 and a second scan lens 238. The light beam 202B'''' which exits the second scan lens 238, renders a spot 262B on a surface 242 of a photosensitive medium 244. The photosensitive medium 244 may be flat or curved. The curved photosensitive medium 244 may include, but is not limited to a shape of a cylinder. The photosensitive medium 244 may be a photoconductor. Spots 262A and 262L are also shown on the surface 242 or the photosensitive medium 244.

Spots 262A, 262B, and 262L are aligned at an angle theta prime 104' relative to the scan axis direction 106', as defined by coordinate system 312. The scan axis direction 106' is also referred to as the scan direction. Rotation 316 of the photosensitive medium 244 around an axis substantially in the scan axis direction 106' in combination with rotation 306 of the polygon 304 forms scan lines 410A, 410B, and 410L on the photosensitive medium 244. The vertical distance 112' between adjacent scan lines 410A and 410B varies with the angle theta 104 of the light emitter array (See FIGS. 1 and 2). Light beams 202A'''' and 202L'''' are shown and result from light sources 110A and 110L respectively. Light beams 202A'''' and 202L'''' may be overscanned beyond a print format in the scan direction 106' to illuminate scan lines 410A and 410L on a surface 336 of a first optical sensor 318.

A connection 320 communicates signals from the first optical sensor 318 to a controller 322. The controller 322 processes information from the first optical sensor 318 to determine the vertical separation 114' between the light beams 202A'''' and 202L'''' and hence the vertical separation between scan lines 410A and 410L.

The controller 322 compares the vertical separation 114' with a desired swath height value 334 which may be stored in a memory element in the controller, stored externally from the controller 322, or input to the controller from an external source. The controller 322 compares the vertical separation 114' with the desired swath height value 334, and generates an error value 340 (See FIG. 14) in controller 322. A control signal 324 including electrical voltage or current signals, for example, an electrical signal 330 such as a pulse 331 or other types of signals are formed from the error value 340. As an example, the pulse 331 can have a pulse width 332 ranging from about 1 millisecond to 10 seconds. The pulse 331 is shown to be positive, even though pulse 331 can be negative and of various controllable amplitudes.

The control signal 324 drives an actuator 326. The actuator may include a coreless direct current motor operatively coupled to a cam. The actuator may also include a gear reducer. One or more pulses 331, having a 1 millisecond pulse width 332, may be used to move the actuator a very small and precise amount. A pulse 331 having a 10 second pulse width 332 may be used to move the actuator 326 a full revolution or more.

The actuator 326 is operatively coupled to either the first optical element 210, the second optical element 218, or combinations thereof. The actuator 326 may rotate 308 either the first 210 or the second 218 optical element or combinations thereof around a vertical axis 250. The first optical element 210 may be rotated 308 around a vertical axis 252. The second optical element 218 may be rotated 308 around a vertical axis 254. Either the first 210 or the second 218 optical elements, or combinations thereof may be rotated 308 around a vertical axis 328 which has been displaced from vertical axes 250, 252, and 254. Furthermore, optical elements 210 or 218 or both may be rotated 308 around any vertical axis, as shown by the vertical axis direction 108 in coordinate system 310. The optical elements 210 or 218 or both may be rotated 308 to reduce the magnitude of the error value 340 as described in reference to FIG. 14.

Figure 11:
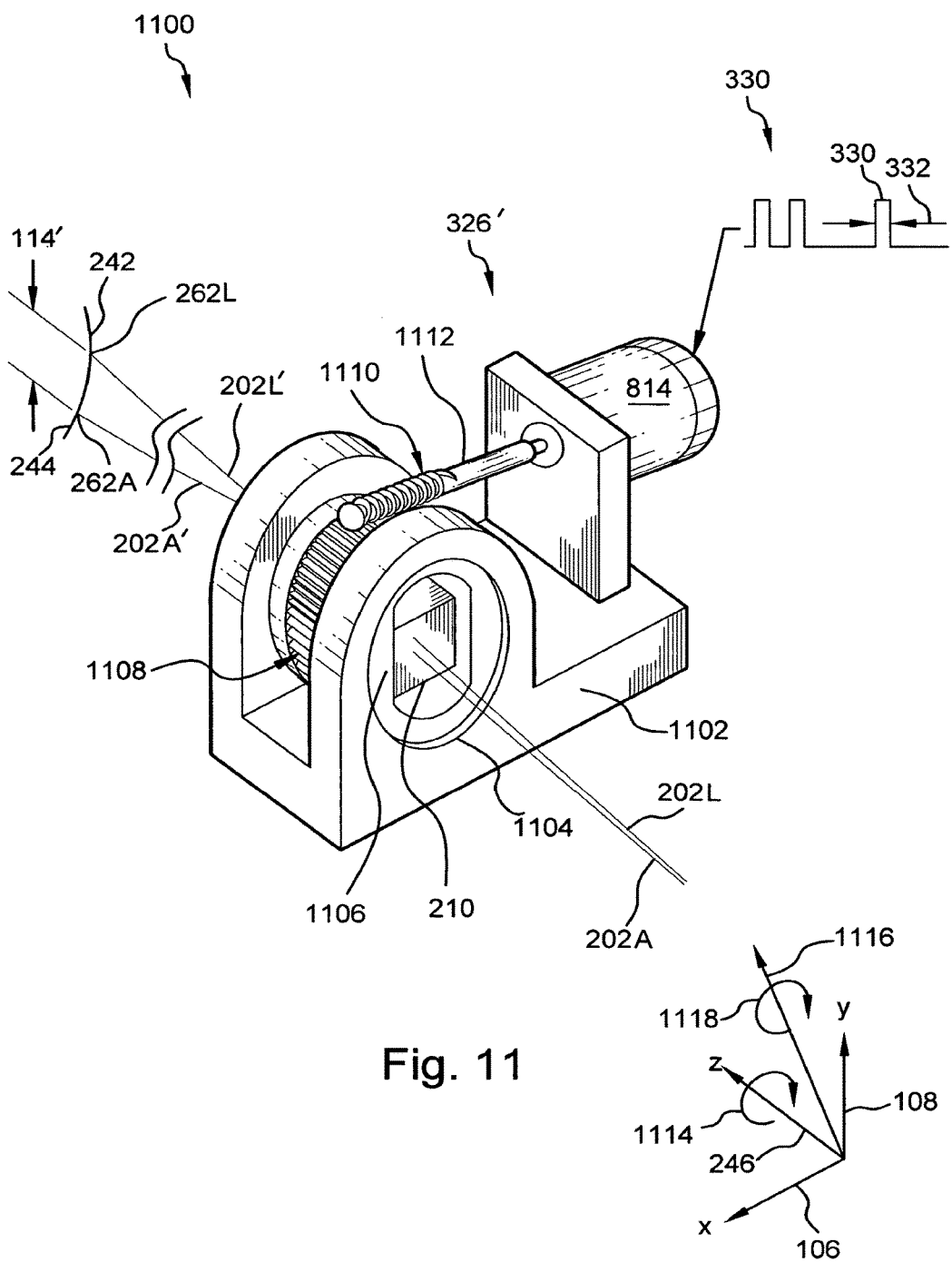
FIG. 11 illustrates another embodiment of an adjustment mechanism for rotating optical elements about an optical axis direction according to an embodiment of an electrophotographic printing system.

As will be shown and described in reference to FIG. 11, the actuator 326 may also be configured to selectively rotate 338 either the first optical element 210 or the second optical element 218, or both the first optical element 210 and the second optical element 218 around an optical axis direction 246.

FIG. 4 shows swaths 402, 404, 406, and 408 which are correctly aligned 400 according to an embodiment of an electrophotographic printing system. Light sources 110A through 110L form light beams 202A through 202L (See FIGS. 1 and 2). Light beams 202A through 202L are scanned by polygon 304 (See FIG. 3) and form a swath 402 which includes scan lines 410A through 410L. Swath 402 is an example of an illumination pattern which can be formed on a surface 242 of a photosensitive medium 244 as shown in FIGS. 2 and 3. The swath 402 may be developed with ink or toner and transferred to media 1418 (See FIG. 14) to form a printed image. In operation, an electrophotographic printing system can modulate the beams forming scan lines within swath 402 to form individual exposed areas which, after development, become printed areas such as pixels, subpixels, half-tone dots and the like. The individual exposed areas can be arranged to render a printed image.

Swath 402 includes scan lines 410A through 410L. Adjacent scan lines 410 are separated by the vertical distance 112'. The most distant scan lines 410A and 410L are separated by the vertical separation 114'. A second swath 404 is above the first swath 402, a third swath 406 is above the second swath 404, and a forth swath 408 is above the third swath 406. A gap 412 occurs between swaths 402 and 404, swaths 404 and 406, and swaths 406 and 408. If the height of the gap 412 between swaths is substantially similar to the vertical distance 112' between adjacent scan lines 410, then banding may not be apparent, or at least minimized.

The vertical distance 112' and the vertical separation 114' are in the vertical direction 108. The long dimension of swaths 402, 404, 406, and 408; and scan lines 410A through 410L are in the scan axis direction 106'.

FIG. 5 illustrates swaths 502, 504, 506, and 508, which are incorrectly aligned 500. Scan lines 510A through 510L are spaced too far apart according to an embodiment of an electrophotographic printing system. In a similar manner as described in FIG. 4, swaths 502, 504, 506, and 508 each have a vertical distance 112" between adjacent scan lines 510A through 510L. Scan lines 510A through 510L occur within a swath. The most distant scan lines 510A and 510L are separated by a vertical separation 114". The vertical distance 112" between adjacent scan lines 510 within a swath is greater than a gap 512 which occurs between swaths 502, 504, 506, and 508. This increased vertical distance 112" may be a result of angle theta 104 (See FIGS. 1 and 3) on the light emitter array 102 (See FIG. 1) being large, causing the gap 512 to be less than the vertical distance 112" between adjacent scan lines 510. The relatively small gaps 512 between swaths 502, 504, 506, and 508 visually appear as banding. Two scan lines 510A and 510L on each side of the gap 512 appear as a dark band.

FIG. 6 illustrates swaths 602, 604, 606, and 608, which are incorrectly aligned 600. Scan lines 610A through 610L are spaced too close together according to an embodiment of an electrophotographic printing system.

In a similar manner as described in FIG. 4, swaths 602, 604, 606, and 608 each have a vertical distance 112''' between adjacent scan lines 610A through 610L. The most distant scan lines 610A and 610L are separated by a vertical separation 114'''. The vertical distance 112''' between adjacent scan lines 610 within a swath is narrower than a gap 612 which occurs between swaths 602, 604, 606, and 608. This relatively smaller vertical distance 112''' may be caused by too small of an angle theta 104 (See FIG. 1) on the light emitter array 102, which in turn can cause the gap 612 to be wider than the vertical distance 112''' between adjacent scan lines 610 within a swath. The relatively large gaps 612 between the swaths 602, 604, 606, and 608 visually appear as banding. The anomalously wide gap 612 between the two scan lines 610A and 610L appears as a light band.

FIG. 7 shows an optical sensor 318 illuminated with scan lines 410A and 410L and a spatial exposure distribution profile 708 of sensed scan lines 410A and 410L according to an embodiment of an electrophotographic printing system.

During configuration, alignment, or another procedure, scan lines 410A and 410L may illuminate a first optical sensor 318 at an end of a scan (beyond an edge of a printed image area) as shown in FIGS. 3 and 7. The first optical sensor 318 may also be at the beginning of the scan, such as, before the start of the printed image area, or in any other position in which the first optical sensor 318 may be illuminated. Non-scanning spots 262 (See FIG. 3) formed by light beams 202"" may be positioned on the first optical sensor 318, in combination with, or as a replacement for, scan lines 410A and 410L. The scan lines 410A and 410L are formed by scanning spots 262. The vertical separation 114' between, for example, the most distant scan lines 410A and 410L can be sensed by the first optical sensor 318.

The first optical sensor 318 has a width 702 along the scan axis direction 106' and a height 704 along a vertical direction 108. Optical sensor elements 706 may be arranged along the width 702 and height 704. The optical sensor 318 may be, but is not limited to, a charge coupled device, a CMOS device, a multi-element photodiode, a photosensitive medium, a position sensitive device, or a split sensor.

The scan lines 410A and 410L form the spatial exposure distribution profile 708 along a vertical direction 108 on the surface 336 of the first optical sensor 318. The spatial exposure distribution profile 708 has a first peak 710 and a second peak 712 coincident with the exposure intensity of the first scan line 410A and the last scan line 410L respectively. Alternately, other scan lines could be used. The peaks 710 and 712 may also represent a spatial distribution of the exposure of non-scanning spots 262 (See FIG. 3) on the first optical sensor 318. The peaks 710 and 712 may also represent the spatial exposure distribution profile 708 of the exposure intensity of the scan lines 410A and 410L averaged in the scan axis direction 106'. The distance 726 between the first 710 and second 712 peaks is an indicator of the vertical separation 114'. Averaging, or other data processing in the scan axis direction 106' can reduce the variability of the measured distance 726 between the first 710 and second 712 peaks and increase the accuracy of the measurement.

The distance 726 between the first 710 and second 712 peaks can be calculated by the difference between an estimate of the location of the second peak 724 and an estimate of the location of the first peak 718. An estimate of the location 718 of the first peak 710 may be obtained by measuring a first edge 714 of the first peak 710 and a second edge 716 of the first peak 710, and by averaging the first edge 714 with the second edge 716, the edges being determined by the intersection of the exposure distribution 708 and a predetermined exposure level (not shown). Likewise, an estimate of the location 724 of the second peak 712 can be obtained by measuring a first edge 720 of a second peak 712 and a second edge 722 of the second peak 712 and averaging the first edge 720 with the second edge 722. The location of the peaks 718 and 724 can also be estimated by a weighted average, the median, the mode, one half the range, the difference between the first edges 714 and 720, the difference between second edges 716 and 722 or any other calculation of the distance between scan lines 410A and 410L. The calculations of distance 726 may use one or more of multiplication, division, subtraction, or addition, or combinations thereof.

Figure 8:
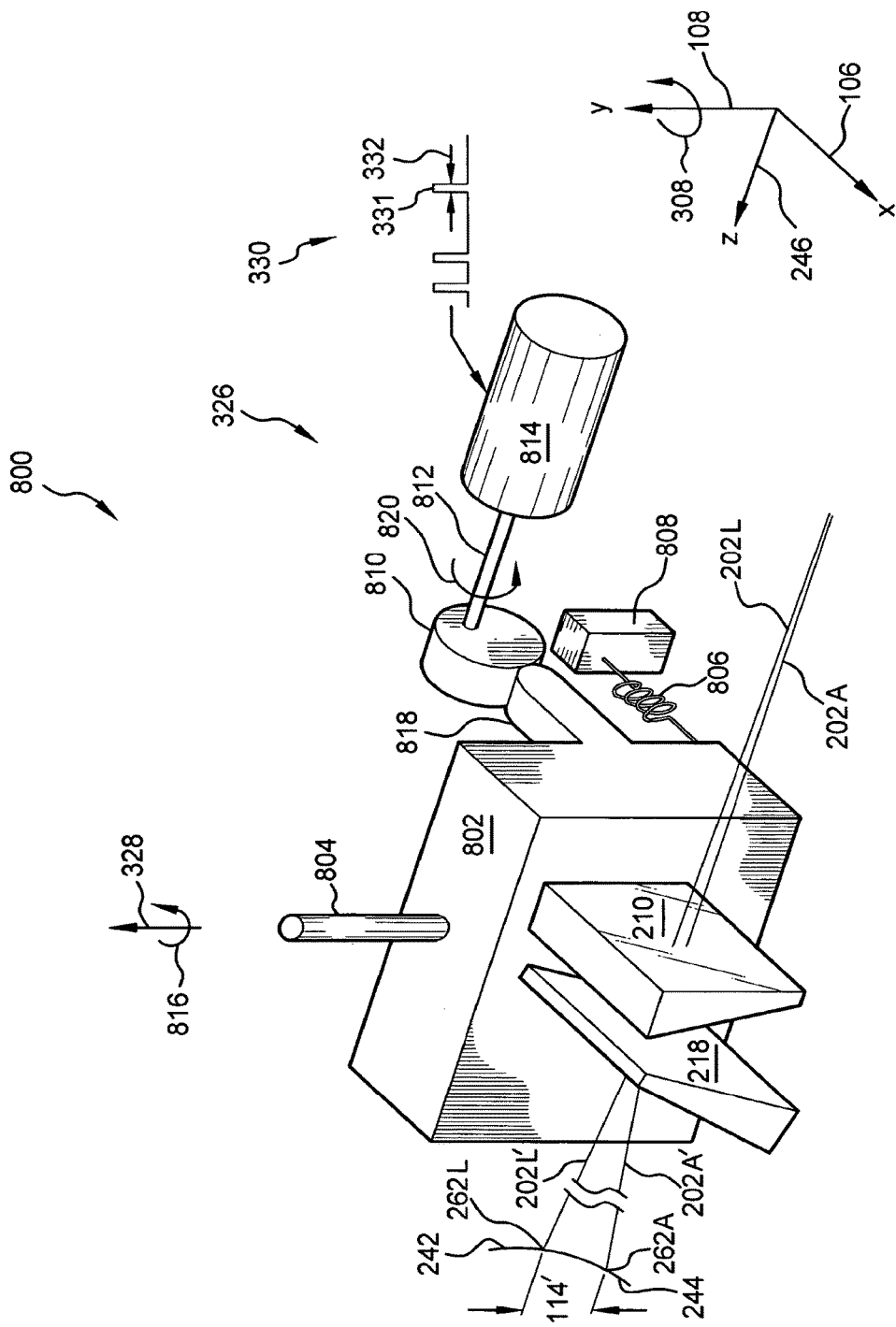
FIG. 8 shows an embodiment of an adjustment mechanism for rotating optical elements around a vertical axis according to an embodiment of an electrophotographic printing system.

FIG. 8 shows an embodiment of an adjustment mechanism 800 for rotating 308 either a first optical element 210, or a second optical element 218, or combinations thereof around a vertical direction 108. The rotation 308 is shown as counterclockwise, however it may also be clockwise. All of the light beams 202A through 202L pass through the optical elements 210 and 218, however, not all of the light beams are shown for clarity. One beam is shown for each of the illustrated beams 202A and 202L. Any one of the optical elements 210 and 218 may be one or more of a prism, a diffraction grating, a Fresnel prism, a cylinder lens, or a gradient index plate, or combinations thereof.

The optical elements 210 and 218 are rotated 816 around an axis 328 in a vertical direction which may or may not be through the optical elements 210 and 218. For example, the optical elements 210 and 218 may be rotated 308 around a vertical direction 108 which is in the same direction as the vertical direction 328. The rotation 308 around the vertical direction 108 may be displaced in the scan axis direction 106 or the optical axis direction 246 or both.

Figure 14:
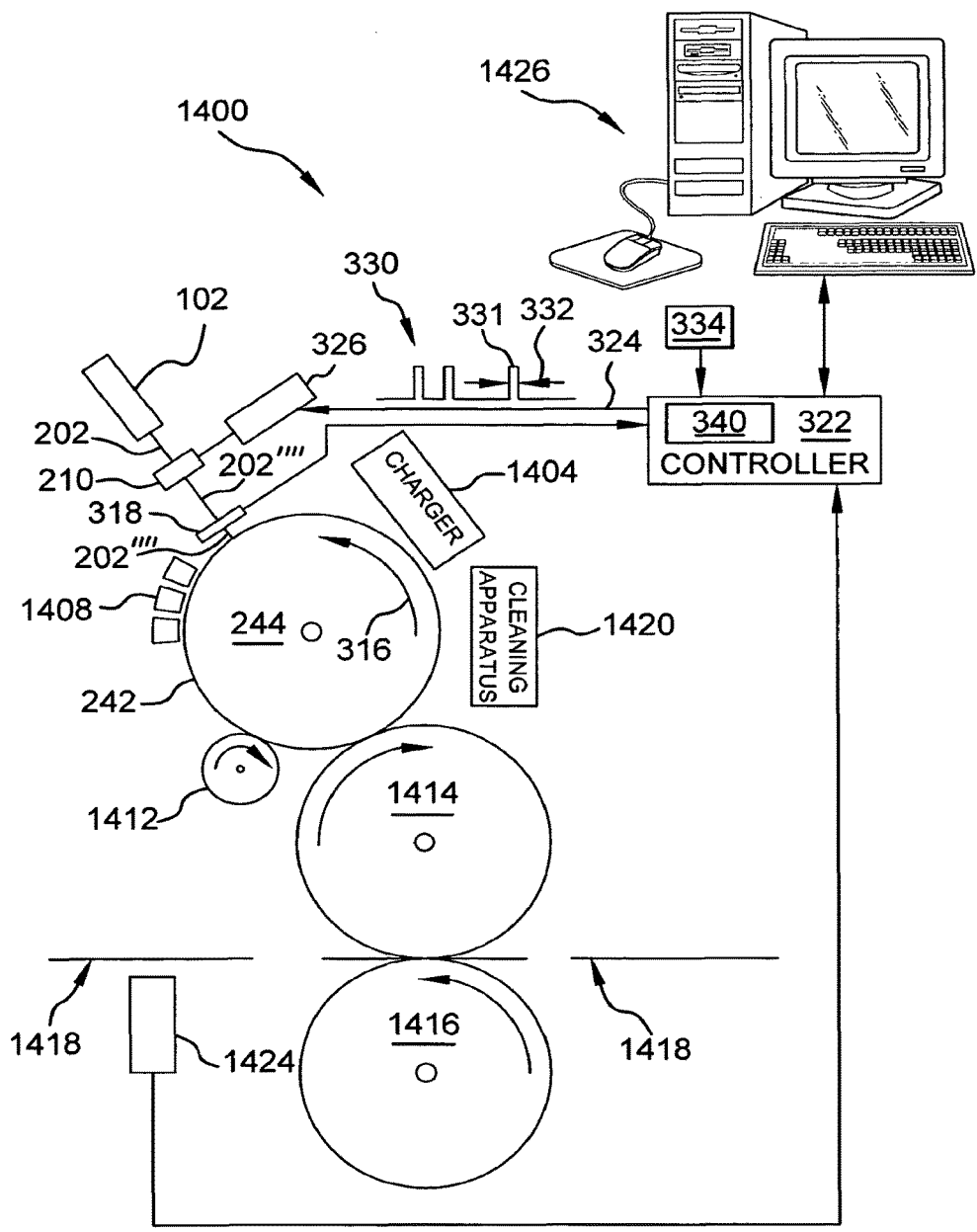
FIG. 14 illustrates an electrophotographic printing system according to an embodiment of an electrophotographic printing system.

The optical elements 210 or 218 or both may be rotated to reduce the magnitude of the error value 340 as discussed in reference to FIG. 14.

Optical elements 210 and 218 are operatively coupled to a movable mount 802. A surface 818 on the movable mount 802 contacts a cam 810. The cam 810 is coupled to a shaft 812 and may be offset from the shaft. The shaft 812 is coupled to a motor 814. The motor 814 may be a coreless direct current motor and may include a gear reducer (not shown). The cam 810, the shaft, 812, and the motor 814 form an actuator 326. The surface 818 of the movable mount 802 remains in contact with the cam 810 by a retainer 806 which may be a spring, a flexure, a flexible membrane, or any other force producing member. The retainer 806 is attached to a fixed mount 808 which is relatively stationary with respect to the movable mount 802.

The motor 814 is driven by an electrical voltage or current signal. For example an electrical signal 330 including a pulse 331, the pulse 331 having a width 332. A pulse width 332 of 10 seconds for pulse 331 may cause the cam 810 to rotate a complete revolution. A pulse width 332 of 1 millisecond may cause the cam 810 to rotate a small and repeatable amount. Rotation 820 of the cam 810 results in rotation 816 of the movable mount 802 around: a pivot shaft 804, a flex pivot (not shown), or other rotatable bearing to effect rotation 816 of either optical element 210, or optical element 218, or both optical element 210 and optical element 218 around an axis 328. The rotation 816 may be clockwise or counterclockwise.

Rotation 816 changes the paths of light beams 202A' and 202L' resulting in a changing vertical separation 114' between the most distant spots 262A and 262L on a surface 242 of a photosensitive medium 244.

Although rotations 308 have been described as rotating around an axis in the vertical direction 108; off-axis deviations due to tolerance inaccuracies, desired optical configurations, or other factors are possible. The rotation 308 about an axis in the vertical direction 108 may also be substantially in the vertical direction, such as, within the range of 45 to 135 degrees from the scan axis direction 106. Also, the vertical direction 108 may be within a narrower range of about 80 to 100 degrees from the scan axis direction 106.

Figure 9:
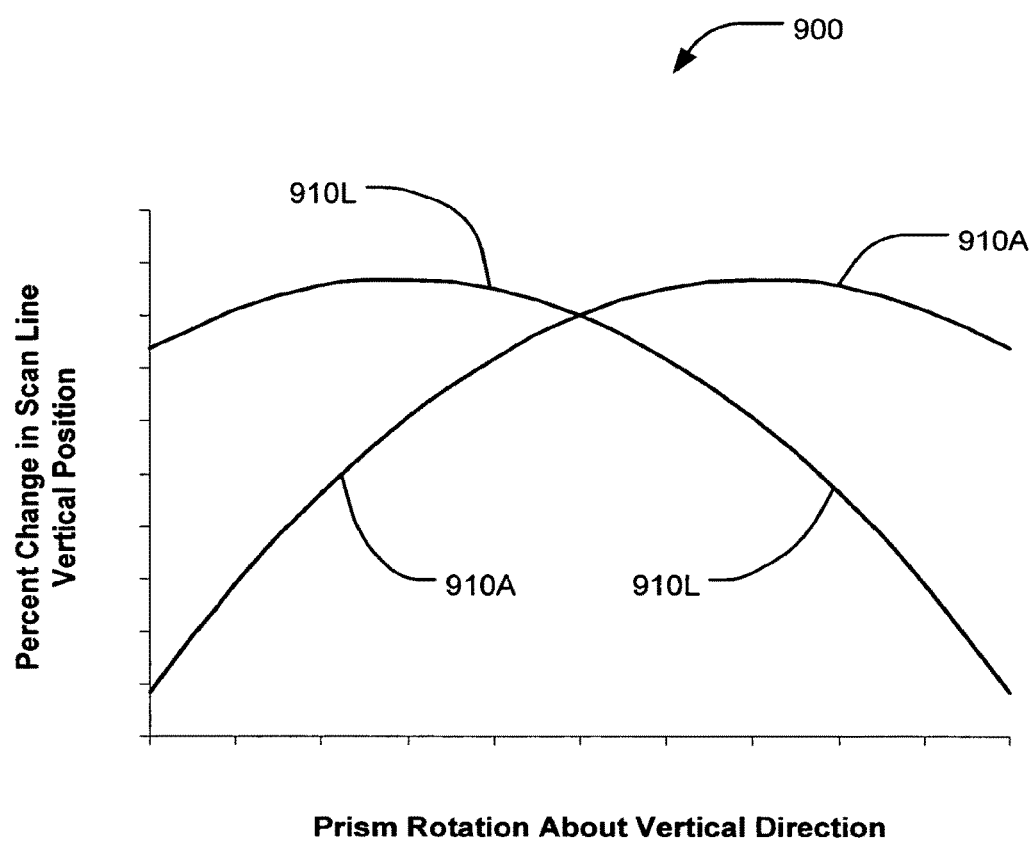
FIG. 9 is a graph of scan line vertical separation as a function of an angle of two prisms rotated around a vertical axis according to an embodiment of an electrophotographic printing system.

FIG. 9 is a graph 900 of a scan line vertical position as a function of an optical element rotation around a vertical axis according to an embodiment of an electrophotographic printing system. If the optical elements 210 and 218 are prisms (See FIG. 8); and the prisms are rotated 816 about a vertical axis 328, the change in a scan line vertical position is shown as a function of prism rotation. The curve 910A shows the change in the vertical position of scan line 410A (See FIG. 4) as a percentage of the nominal distance between scan lines 410A and 410L. Similarly, the curve 910L shows the change in the vertical position of scan line 410L (See FIG. 4) as a percentage of the nominal distance between scan lines 410A and 410L.

Figure 10:
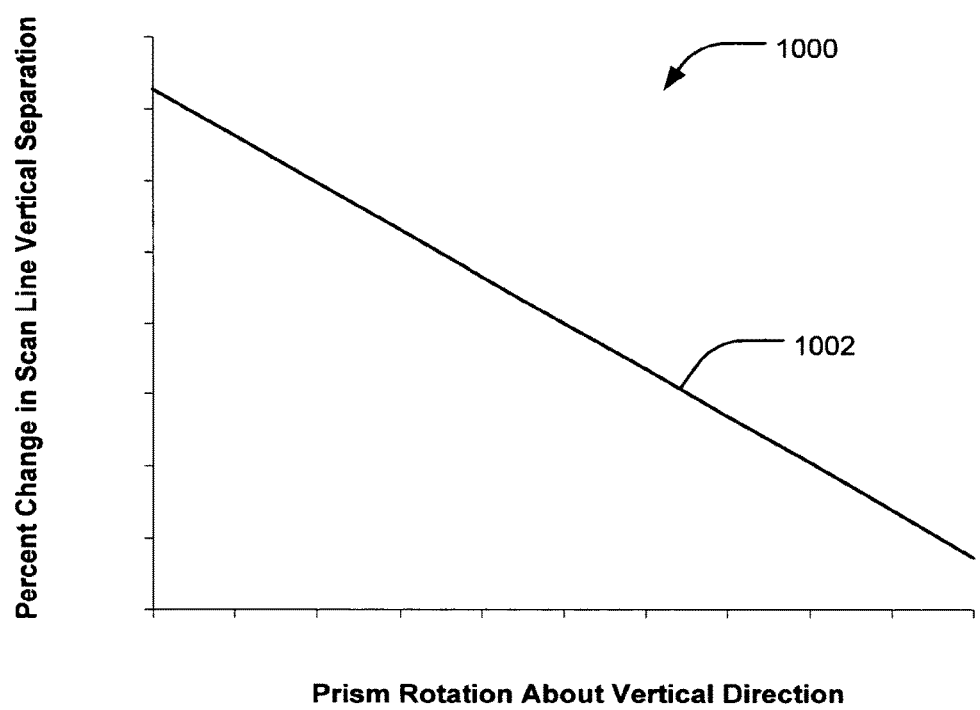
FIG. 10 is a graph of the percent change in the distance between two scan lines as a function of an angle of two prisms rotated around a vertical axis according to an embodiment of an electrophotographic printing system.

FIG. 10 is a graph 1000 of the percentage change in the vertical separation between two scan lines as a function of optical element rotation around a vertical axis according to an embodiment of an electrophotographic printing system. Curve 1002 shows the difference between curves 910L and 910A (See FIG. 9) as a percentage change in the vertical separation 114' (See FIG. 4) between most distant scan lines 410A and 410L. Curve 1002 is a function of optical element rotation 816 (See FIG. 8) around a vertical axis 328. The slope of curve 1002 is relatively low, which is a desirable property, in that the rotation 328 (See FIG. 8) of the optical elements 210 and 218 effects a relatively small percentage change in the vertical separation 114'. Curve 1002 is substantially linear over the shown range of rotation 816 (See FIG. 8) about a vertical direction 328. The property of linearity is useful in a control system, because linear relationships have well established theories for stability and system performance.

FIG. 11 illustrates another embodiment of an adjustment mechanism 1100 for rotating optical elements 210 and 218 (not shown in FIG. 11; however the second optical element 218 is behind the first optical element 210 in the optical axis direction 246 as shown in FIGS. 2, 3, and 8) around 1114 an optical axis direction 246 according to an embodiment of an electrophotographic printing system. The rotation 1114 is shown as clockwise, however it may also be counter clockwise. Light beams 202A and 202L pass through the optical elements 210 and 218 (not shown). Not all of the light beams are shown for clarity and one ray, represented by a line is shown for each of the illustrated beams 202A and 202L. Any one of the optical elements 210 and 218 may be one or more of a prism, a diffraction grating, a Fresnel prism, a cylinder lens, a gradient index plate, or combinations thereof. Other optical elements 210 and 218 which exhibit anamorphic magnification may be used.

As an example, the first optical element 210 may be a first cylinder lens having positive optical power in a y-z plane containing the vertical direction 108 and the optical axis direction 246. The second optical element 218 (See FIGS. 2, 3, and 8) is behind the first optical element 210 in the optical axis direction 246. The second optical element 218 may be a second cylinder lens having negative optical power in a y-z plane containing the vertical direction 108 and the optical axis direction 246. In combination, the first and second cylinder lenses may form an afocal cylindrical telescope having anamorphic magnification. The afocal cylindrical telescope may have optical magnification in the vertical direction 108, but no magnification in the scan axis direction 106. Rotating either the first cylinder lens, the second cylinder lens, or combinations thereof about an optical axis 246 effects a change in the vertical separation 114' (See FIG. 4).

As previously mentioned, the first optical element 210 and the second optical element 218 (See FIGS. 2, 3, and 8) are rotated 1114 around the optical axis direction 246. The optical elements 210 or 218 or both may be rotated 1114 to reduce the magnitude of the error value 340 (See FIG. 14). Optical elements 210 and 218 (See FIGS. 2, 3, and 8) are operatively coupled to a rotary member 1106 having gear teeth 1108. The rotary member 1106 rotates in an opening 1104 within a housing 1102. A helical worm 1110 on a shaft 1112 is operatively coupled to the gear teeth 1108. The shaft 1112 is operatively coupled to a motor 814. The motor 814 may be a coreless direct current motor and may include a gear reducer (not shown). A coreless direct current motor offers repeatable positional control when driven with an electrical signal 330 having a pulse 331 with a width 332, for example, of 1 millisecond. The rotary member 1106, the shaft 1112, and the motor 814 form an actuator 326'.

The motor 814 is driven by electrical voltage or current signal, for example, an electrical signal 330 having a pulse 331 with a width 332. A pulse width 332 of 10 seconds may cause the optical elements 210 and 218 (See FIGS. 2,3, and 8) to rotate a complete revolution. A pulse width 332 of 1 millisecond may cause the optical elements 210 and 218 (not shown) to rotate a small and repeatable amount. The pulse 331 may be positive or negative.

When the first optical element 210 and the second optical element 218 (See FIGS. 2, 3, and 8) are rotated 1114, the angle of beams 202A and 202L change. The changing angle of beams 202A' and 202L' varies the vertical separation 114' of the spots 262A and 262L on the surface 242 of the photosensitive medium 244. The varying vertical separation 114' changes the height of swaths 402, 404, 406, and 408 (See FIG. 4). As an example, the vertical separation 114" (See FIG. 5) of swaths 502, 504, 506, and 508 may be adjusted to a desired swath height value 334 (See FIGS. 3 and 14) to match the vertical separation 114' (See FIG. 4). Therefore, the height of the swaths 502, 504, 506, and 508 (See FIG. 5) may be adjusted by rotating 1114 the first optical element 210 and the second optical element 218 (See FIGS. 2, 3, and 8) around the optical axis direction 246 to match the vertical separation 114'.

It is not necessary to vary both of the optical elements 210 and 218. The first optical element 210 or the second optical element 218 may be varied independently to achieve a similar effect.

Furthermore, the first optical element 210, the second optical element 218 (See FIGS. 2, 3, and 8), or both the first optical element 210 and the second optical element 218 may be rotated 1118 around an axis 1116. The axis 1116 is in the y-z plane as defined by the vertical direction 108 and the optical axis direction 246. The variation in vertical separation 114' (See FIG. 4) by rotation 1118 about the axis 1116 can be expected to produce a curve intermediate to the curves 1002 (See FIG. 10) and 1302 (See FIG. 13) respectively. Although rotations 1118 have been described as rotating 1118 around an axis 1116 in the y-z plane; off-axis deviations due to tolerance inaccuracies and desired optical configurations are possible. The axis 1116 may deviate from the y-z plane defined by a vertical direction 108 and an optical axis direction 246 from about 80 to 100 degrees in the scan axis direction 106.

Figure 12:
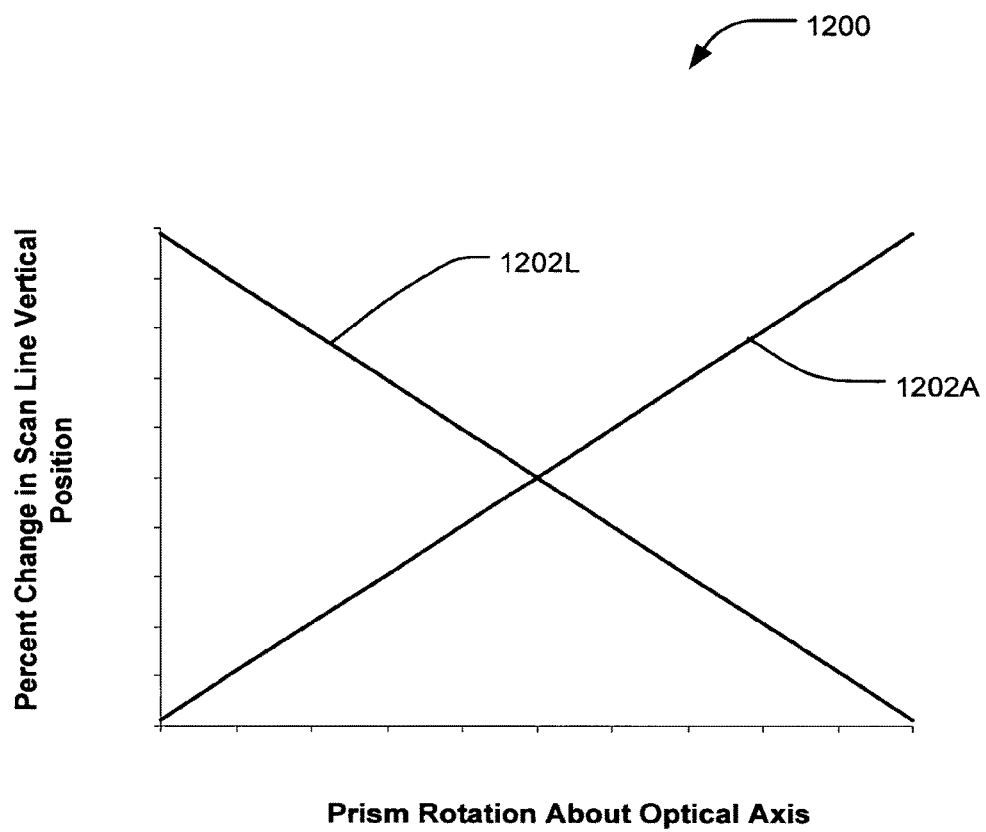
FIG. 12 is a graph of scan line vertical separation as a function of two prisms rotated around the optical axis according to an embodiment of an electrophotographic printing system.

FIG. 12 is a graph 1200 of scan line vertical separation as a function of optical element rotation about an optical axis direction according to an embodiment of an electrophotographic printing system. If the optical elements 210 and 218 are prisms (See FIG. 11); and the prisms are rotated 1114 about an optical axis direction 246, a change in scan line vertical position is shown as a function of prism rotation 1114 in FIG. 12. Curve 1202A shows the change in a vertical position of scan line 410A as a percentage of the nominal distance between scan lines 410A and 410L. Similarly, curve 1202L shows the change in the vertical position of scan line 410L as a percentage of the nominal distance between scan lines 410A and 410L.

Figure 13:
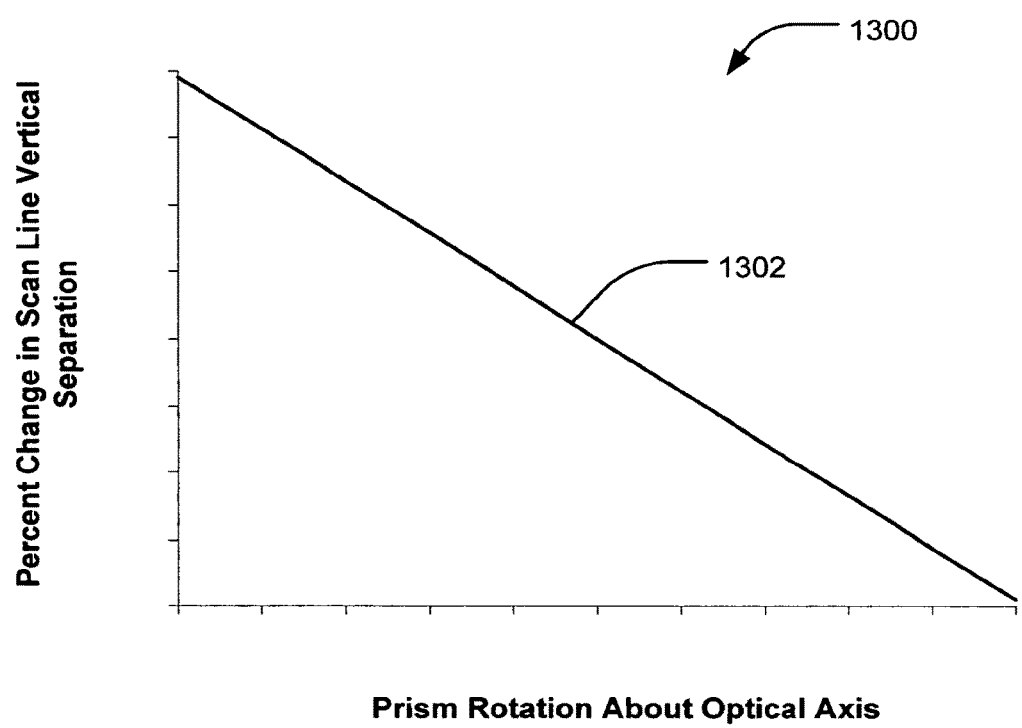
FIG. 13 is a graph of the percent change in the distance between two scan lines as a function of an angle of two prisms rotated around an optical axis according to an embodiment of an electrophotographic printing system.

FIG. 13 is a graph 1300 of the percent change in the vertical distance between two scan lines as a function of optical element rotation around an optical axis according to an embodiment of an electrophotographic printing system. Curve 1302 shows the difference between curves 1202L and 1202A (See FIG. 12) and represents the percentage change in vertical separation 114' (See FIG. 4) of scan lines 410 as a function of optical element rotation 1114 (See FIG. 11) about an optical axis direction 246. Curve 1302 is substantially linear over the shown range of rotation 1114 (See FIG. 11) around the optical axis direction 246. The slope of curve 1302 represents the sensitivity of the change in the vertical separation 114' (See FIG. 4) to the change in rotation 1114 (See FIG. 11). Although this sensitivity is greater than for the rotation 816 (See FIG. 8) of the optical elements 210 and 218 around an axis in the vertical direction, it is less sensitive than for the change in the angle theta 104 (See FIG. 1) of the light emitter array 102. This lower sensitivity is useful, since the rotation 1114 (See FIG. 11) of the optical elements 210 and 218 effects a relatively small change in the vertical separation 114' (See FIG. 4), as compared with changes to the angle theta 104 (See FIG. 1) of the light emitter array 102. Curve 1302 is substantially linear, making it useful and predictable in a control system, because linear relationships have well established theories for stability and system performance.

FIG. 14 illustrates a system diagram of an electrophotographic printing system 1400 according to an embodiment of an electrophotographic printing system. The methodology of the image formation using the electrophotographic printing system 1400 can be accomplished using dry powder toner or liquid ink (also known as liquid toner) systems, for example, the HP INDIGO® Press 5000, available from Hewlett-Packard.

In an embodiment of an electrophotographic printing system, the surface 242 of a photosensitive medium 244 is electrified by a corotron, scorotron, charge roller or another charger 1404. A light beam or light beams 202 from a light emitter array 102 are incident on the surface 242 of the photosensitive medium 244 and form a latent electrostatically charged image thereon. An ink delivery system 1408 is a dispenser of ink, toner, or another type of colorant. The ink or toner may be a liquid or a powder. The ink delivery system may be a binary ink developer BID. Multiple BID cartridges may be used, each containing a different color ink or toner. The latent image is developed by the ink or toner to form a visible image on the surface 242 of the photosensitive medium 244. In some embodiments of the electrophotographic printing system 1400, a squeegee roller 1412 compresses the image and removes excess liquid therefrom. The image is transferred to an intermediate transfer member ITM 1414. The image is then transferred to a medium 1418 at a nip between the ITM 1414 and an impression roller 1416. After transfer of the image to the ITM 1414, residual toner and charge on the photosensitive medium 244 may be removed by a cleaning apparatus 1420, which may be an electrical discharge and a wiper.

Controller 322 is programmed with software to, among other things control the light emitter array 102 to write latent images. Controller 322 also receives data pertaining to vertical separation 114' (See FIG. 3) and makes corrections to the electrophotographic printing system 1400 for correctly adjusting the vertical separation 114'. For example, the vertical separation 114' can be adjusted by directing the actuator 326 to alter a latent image on the surface 242 of a photosensitive medium 244 by rotating either a first optical element 210 a second optical element 218 (not shown. See FIGS. 2, 3, and 8) or both.

The adjustment of the vertical separation 114' may be accomplished automatically, or semi-automatically. In an embodiment of the electrophotographic printing system 1400 where the adjustment of the vertical separation 114' is adjusted semiautomatically, data may be provided to the controller 322 through an input device 1426. The input device 1426, for example, may include a keyboard, mouse, or another type of device. The mouse may select adjustment options from a menu. Data provided to the controller 322 by input device 1426 may result from inspections or measurements from a test pattern which has been printed on a medium 1418 by the electrophotographic printing system 1400. The vertical separation 114 (See FIGS. 2, 3, 4 and 8) may be adjusted by rotating a first optical element 210, a second optical element 218 (See FIGS. 2, 3 and 8) or both. The first optical element 210 may be rotated by an actuator 326 operatively coupled by a control signal 324 to a controller 322. The rotation of the first optical element 210, the second optical element 218 (See FIGS. 2, 3 and 8) or both can change the vertical separation 114' (See FIGS. 3 and 4) on the printed media 1418. The vertical separation 114' can be measured from the printed media 1418 and entered into the input device 1426 which rotates the optical element to change the vertical separation 114'. This process can be continued until an acceptable vertical separation 114' is printed on the media 1418.

In some embodiments of the electrophotographic printing system, the vertical separation 114' (See FIGS. 3 and 4) may be adjusted automatically by a controller 322 using a first sensor 318 in operative communication with the controller 322. The first sensor 318 may detect one or more indicators of vertical separation 114'. The first sensor 318 measures the swath height from light beams 202A"" and 202L"" (See FIG. 3) or scan lines 410A and 410L (See FIGS. 3 and 7). The first sensor 318 may also measure other beams or combinations of beams. The first sensor 318 can be located near an edge of the photosensitive medium 244 (See FIG. 3) or in the conjugate location formed by a folding mirror (not shown) to a near-edge point of the photosensitive medium 244 so that the first sensor 318 does not block the formation of the latent image on the surface 242 of the photosensitive medium 244.

The measured vertical separation 114' (See FIGS. 3 and 4) is compared to a desired swath height value 334 to form an error value 340. If the vertical separation 114' equals the desired swath height value 334, then the error value 340 is zero, and no adjustment of either the first optical elements 210 or the second optical element 218 (See FIGS. 3 and 4) or both occurs. If the vertical separation 114' is greater or less than the desired swath height value 334, then the error value 340 is not zero and either the first optical element 210 and the second optical element 218 (See FIGS. 2, 3, 4, and 8) or both are rotated to adjust the vertical separation 114' (See FIGS. 3 and 4) to reduce the magnitude of the error value 340.

The optical elements 210 and 218 can be rotated by an actuator 326 operatively coupled to the controller 322 by a control signal 324. The controller 322 controls the actuator 326 by sending one or more electrical signals 330 having a pulse 331 with a width 332 to the actuator 326 by control signal 324. The controller 322 can command the electrophotographic printing system 1400 to change the vertical separation 114' (see FIGS. 3 and 4) to match a desired swath height value 334. The desired swath height value 334 may be communicated to the controller 322 through a hardware port, by an input device 1426, by in an internal register within the controller 322, and the like.

In other embodiments of the electrophotographic printing system 1400, the vertical separation 114' (see FIGS. 3 and 4) may be adjusted automatically by the controller 322 using a second sensor 1424 in operative communication with controller 322. The second sensor 1424 detects a printed pattern on the media 1418 and operatively communicates with the controller 322 to adjust the first optical element 210, the second optical element 218 (not shown. See FIGS. 2, 3 and 8), or both by actuator 326 in a similar manner as described in the previous paragraphs.

Figure 15:
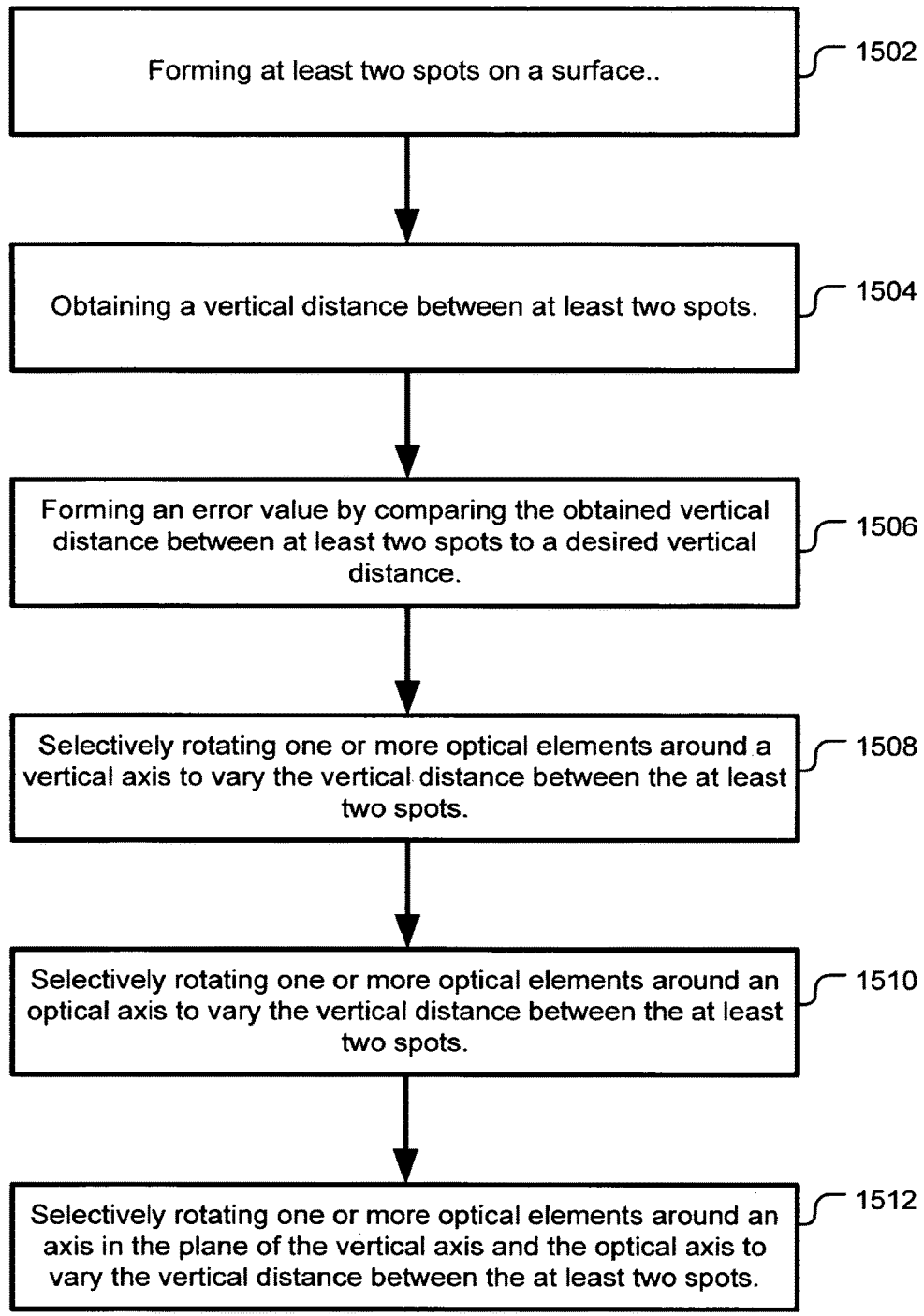
FIG. 15 shows a flow diagram having procedural acts according to an embodiment of an electrophotographic printing system.

FIG. 15 shows a flow diagram having procedural acts according to an embodiment of an electrophotographic printing system.

In act 1502, at least two spots 262 (See FIGS. 2, 3, 8, and 11) are formed on a surface 242 of a photosensitive medium 244. The at least two spots 262 can be used to form an electrostatic latent image on the surface 242 of the photosensitive medium 244. The electrostatic latent image on the surface 242 of the photosensitive medium 244 can be developed with toner or ink to produce a printed image on media 1418 as shown in FIG. 14. The at least two spots 262 may be scanned by rotating a polygon 304 (See FIG. 3) to form an electrostatic latent image and printed swath 402, 404, 406 or 408 (See FIG. 4) with two or more scan lines 410. The printed density of the scan lines 410 may be modulated to render an image (not shown). One form of modulation is to alternately turn on and off a light source 110 (See FIG. 1) for printing alternate dark and light areas.

In act 1504, a vertical distance between at least two spots 262 (See FIGS. 2 and 3) can be obtained by the vertical separation 114' between most distant spots 262A and 262L, or the vertical distance 112' between adjacent spots 262. A vertical distance may be obtained between any spots 262 even if they are not the most distant or adjacent.

As an example, according to an embodiment of an electrophotographic printing system, the vertical distance, and hence the vertical separation 114' (See FIG. 3), between most distant spots 262A and 262L may be obtained by a first optical sensor 318. Spots 262A and 262L are scanned by rotating 306 polygon 304 to form scan lines 410A and 410L respectively (See FIGS. 3 and 7). The scan lines 410A and 410L are separated by substantially the same vertical separation 114' as spots 262A and 262L. According to an embodiment of an electrophotographic printing system, the distance between the spots 262A and 262L can be obtained by detecting the scan lines 410A and 410L on a first optical sensor 318 as shown and described in reference to FIGS. 3, 7, and 14. The separation between spots 262 may also be obtained by printing spots 262, scan lines 410, or other objects, on a medium 1418 (See FIG. 14) and detecting the vertical distance between the spots 262, the scan lines 410, or the other objects using a second sensor 1424. The second sensor 1424 may be an optical sensor similar to the first optical sensor 318 as shown and described in reference to FIGS. 3, 7, and 14. The second sensor may have a lens to reimage the printed medium onto the sensor.

The distance between the spots 262A and 262L can also be obtained by printing spots 262, scan lines 410, or other objects, on a media 1418 and measuring the vertical distance between the spots 262, the scan lines 410, or the other objects using a measuring device such as a scale, an optical comparator, a microscope, calipers, a scanner device (flatbed or other type) and the like.

In act 1506, an error value 340 (See FIG. 14) is formed by comparing the obtained vertical distance, for example, 114' (See FIGS. 3 and 4) in act 1504 to a desired swath height value 334 (See FIG. 14). The comparison may be made by a controller 322 (See FIGS. 3 and 14). The desired swath height value 334 (See FIGS. 3 and 14) is shown external to the controller, although it can be internal to the controller such as data in memory.

In act 1508, a vertical distance 112' (See FIGS. 2, 3, and 8), or vertical separation 114' between at least two spots 262 may be adjusted by selectively rotating 308 one or more optical elements 210 or 218 about a vertical direction 108, 250, 252, 254, 328. The optical elements 210 and 218 may be prisms. Rotation 308 of one or more of the optical elements 210 or 218 or both may be performed by an adjustment mechanism 800 as shown in FIG. 8.

In act 1510, a vertical distance between at least two spots 262 (See FIG. 11) may be adjusted by selectively rotating one or more optical elements 210 or 218 (See FIGS. 2, 3, and 8) or both around 1114 (See FIG. 11) an optical axis direction 246. The optical elements may be prisms. Rotation 1114 of one or more of the optical elements 210 or 218 (See FIGS. 2, 3, and 8) or both may be performed by an adjustment mechanism 1100 as shown in FIG. 11.

In act 1512, a vertical distance between at least two spots 262 (See FIG. 11) may be adjusted by selectively rotating 1118 one or more optical elements 210 or 218 (See FIGS. 2, 3 and 8) or both around an axis direction 1116 (See FIG. 11) which is in the y-z plane of the vertical direction 108 axis and the optical axis 246. The optical elements may be prisms. Rotation 1118 of one or more of the optical elements 210 or 218 (See FIGS. 2, 3, and 8) or both may be performed by an adjustment mechanism 1100 in FIG. 11 which may be tilted at an angle (not shown) between the vertical direction 108 and an optical axis direction 246.

An embodiment of an electrostatic printing system has been used to describe how optical elements 210, 218 (See FIGS. 2, 3, 8, and 11) can be rotated around an axis in the vertical direction 108, around an axis in the optical axis direction 246, around an axis in the y-z plane formed by the vertical direction 108 and the optical axis direction 246, or around combinations of axes thereof to adjust a vertical separation 114' or a vertical distance 112' between spots 262 or scan lines 410 (See FIG. 4). However, it is not necessary that the axis or axes be 90 degrees from the scan axis direction 106. Substantial angular deviations of the axes, in the range of 45 degrees to 135 degrees from the scan axis direction 106 are acceptable. Deviations in the range of 80 to 100 degrees can be achieved with current optical configurations.

While the present embodiments of an electrostatic printing system have been particularly shown and described, those skilled in the art will understand that many variations may be made therein without departing from the spirit and scope of the embodiments defined in the following claims. The description of the embodiment is understood to include all novel and non-obvious combinations of elements described herein, and claims may be presented in this or a later application to any novel and non-obvious combination of these elements. The foregoing embodiments are illustrative, and no single feature or element would have to be included in all possible combinations that may be claimed in this or a later application. Where the claims recite "a" or "a first" element of the equivalent thereof, such claims should be understood to include incorporation of one or more such elements, neither specifically including nor excluding two or more such elements. Although exemplary embodiments of an electrophotographic printing system have been described, the application is not limited and may include a photocopier, a facsimile machine, a photographic output scanner, analytical equipment, and the like.

What is claimed is:

1. A method comprising:
    forming at least two spots;
    obtaining a vertical separation between the at least two spots;
    comparing the vertical separation to a desired swath height value of a vertical separation to form an error value; and
    selectively rotating either a first optical element, or a second optical element, or combinations thereof, around either an axis substantially in a vertical direction, an axis substantially in an optical axis direction, or an axis substantially in a plane formed by the vertical direction and the optical axis direction, or combinations of axes thereof in response to the error value.

2. The method of claim 1, wherein forming at least two spots further comprises forming one or more of a first scan line, and a second scan line, or combinations thereof.

3. The method of claim 1, wherein obtaining the vertical separation between the at least two spots further comprises printing the at least two spots onto a medium and measuring the vertical separation between the printed spots.

4. The method of claim 3, wherein one or more of the vertical separation, or the error value, or combinations thereof, are entered into an input device.

5. The method of claim 1, wherein obtaining the vertical separation between the at least two spots comprises illuminating an optical sensor with the at least two spots to form a spatial exposure distribution profile indicating the vertical separation between the at least two spots.

6. The method of claim 5, wherein the at least two spots are scanned to form at least two scan lines illuminating the optical sensor, where each of the scan lines forms a spatial exposure distribution profile having at least two peaks indicating the vertical separation between the at least two spots.

7. The method of claim 6, wherein a first edge of a first peak is averaged with a second edge of the first peak, and a first edge of a second peak is averaged with a second edge of the second peak to indicate the vertical separation.

8. The method of claim 7, wherein a distance between the first peak and the second peak is calculated as a difference between the average of the first peak and the average of the second peak to indicate the vertical separation.

9. The method of claim 1, wherein the error value is calculated by one or more of a difference, a ratio, a summation, an absolute value, or a multiplication, or combinations thereof.

10. The method of claim 9, wherein the error value is calculated by a controller.

11. The method of claim 1, wherein one or both optical elements is selectively rotated by an actuator in response to a control signal to reduce a magnitude of the error value.

* * * * *